US012595083B1

(12) United States Patent
Schumann

(10) Patent No.: US 12,595,083 B1
(45) Date of Patent: Apr. 7, 2026

(54) DRONE BASE

(71) Applicant: Blue Vigil LLC, Reston, VA (US)

(72) Inventor: Robert Schumann, Reston, VA (US)

(73) Assignee: Blue Vigil LLC, Reston, VA (US)

( * ) Notice: Subject to any disclaimer, the term of this patent is extended or adjusted under 35 U.S.C. 154(b) by 0 days.

(21) Appl. No.: 18/953,911

(22) Filed: Nov. 20, 2024

(51) Int. Cl.
　*B64U 70/97* 　(2023.01)
　*B64U 10/60* 　(2023.01)
(52) U.S. Cl.
　CPC ............. *B64U 70/97* (2023.01); *B64U 10/60* (2023.01)
(58) Field of Classification Search
　CPC ................................ B64U 70/97; B64U 10/60
　See application file for complete search history.

(56) References Cited

U.S. PATENT DOCUMENTS

| | | | | |
|---|---|---|---|---|
| 8,654,189 | B1 * | 2/2014 | Spangler ................ | H04N 7/183 |
| | | | | 348/81 |
| 8,991,793 | B1 * | 3/2015 | Bernhardt ................ | B64D 1/22 |
| | | | | 258/1.2 |
| 9,174,733 | B1 * | 11/2015 | Burgess ................... | B64D 1/12 |
| 9,429,953 | B1 * | 8/2016 | Miller ..................... | G01S 19/01 |
| 9,688,404 | B1 * | 6/2017 | Buchmueller ........... | G05D 1/00 |
| 9,764,838 | B2 * | 9/2017 | Priest ..................... | B64U 10/13 |
| 9,817,396 | B1 * | 11/2017 | Takayama ................ | G08G 5/26 |
| 10,187,806 | B2 * | 1/2019 | Priest ..................... | H04W 16/18 |
| 10,192,354 | B2 * | 1/2019 | Terry ...................... | G06T 17/05 |
| 10,207,820 | B2 * | 2/2019 | Sullivan ................... | B64F 3/00 |
| 10,364,026 | B1 * | 7/2019 | Hanlon .................... | B64F 3/02 |

| | | | | |
|---|---|---|---|---|
| 10,399,704 | B2 * | 9/2019 | Briggs, IV ............. | B66D 1/505 |
| 10,507,914 | B2 * | 12/2019 | Walker ..................... | B64F 3/00 |
| 10,669,042 | B2 | 6/2020 | Molnar | |
| 10,696,396 | B2 * | 6/2020 | Buyse ..................... | B64U 10/60 |
| 10,723,455 | B1 * | 7/2020 | Hovey ..................... | A63J 5/02 |
| 10,773,800 | B2 * | 9/2020 | Buyse ..................... | B64U 10/60 |
| 11,027,843 | B2 * | 6/2021 | Prager ..................... | B64D 1/22 |
| 11,513,536 | B2 * | 11/2022 | Fischer ................. | B64U 50/34 |
| 11,787,346 | B2 * | 10/2023 | Smith ..................... | B60R 9/048 |
| | | | | 701/3 |
| 11,794,894 | B2 * | 10/2023 | Brock .................... | B64U 30/20 |
| 11,884,175 | B2 * | 1/2024 | Lacaze ................... | B60L 53/36 |
| 11,949,150 | B1 * | 4/2024 | Henry ................. | B64U 70/90 |
| 11,987,387 | B2 * | 5/2024 | Bostick ................. | B64U 10/60 |
| 11,999,476 | B1 * | 6/2024 | Dao ........................ | H04B 1/38 |
| 12,025,991 | B2 * | 7/2024 | Raabe ................... | H04N 7/183 |

(Continued)

OTHER PUBLICATIONS

International Search Report and Written Opinion, PCT Application PCT/US22/76332, mailed Jan. 31, 2023.

(Continued)

*Primary Examiner* — Medhat Badawi
(74) *Attorney, Agent, or Firm* — MCDONNELL BOEHNEN HULBERT & BERGHOFF LLP

(57) ABSTRACT

A base for engaging a drone includes a collar defined above a landing plane sized to support the drone. The base further includes a plurality of drone guides arrayed about a center-line centered on the collar. Each of the plurality of drone guides includes a substantially conical guide including an open base positioned adjacent to the collar and narrowing towards the landing plane, and a landing pad defined as part of the landing plane, wherein the landing pad is adjacent to a narrowed end of the substantially conical guide, and wherein at the landing pad is radially aligned relative to the collar.

20 Claims, 5 Drawing Sheets

(56) References Cited

U.S. PATENT DOCUMENTS

| | | | | |
|---|---|---|---|---|
| 12,043,411 | B2 * | 7/2024 | Schumann | G05D 1/48 |
| 12,084,179 | B2 * | 9/2024 | Collins | G01L 5/04 |
| 12,168,533 | B1 * | 12/2024 | Hinman | B64U 70/97 |
| 12,371,203 | B2 * | 7/2025 | Howe | B60L 53/00 |
| 12,404,036 | B2 * | 9/2025 | Schumann | F21V 14/003 |
| 12,420,961 | B2 * | 9/2025 | Jeong | B64U 70/00 |
| 12,466,551 | B2 * | 11/2025 | Ismagilov | B64C 27/52 |
| 2004/0167682 | A1 * | 8/2004 | Beck | B64B 1/50 701/2 |
| 2008/0230018 | A1 * | 9/2008 | Kobayashi | F02M 27/02 502/328 |
| 2010/0026007 | A1 * | 2/2010 | Bevirt | B64C 31/06 290/55 |
| 2011/0180667 | A1 * | 7/2011 | O'Brien | B64U 10/60 244/135 R |
| 2011/0180783 | A1 * | 7/2011 | Gao | H10F 77/1437 438/468 |
| 2012/0112008 | A1 * | 5/2012 | Holifield | B64U 10/60 244/155 A |
| 2013/0200207 | A1 * | 8/2013 | Pongratz | B64U 70/20 244/2 |
| 2013/0307274 | A1 * | 11/2013 | Sia | F03D 9/25 290/55 |
| 2015/0129716 | A1 * | 5/2015 | Yoffe | B64F 1/029 244/110 C |
| 2015/0158600 | A1 * | 6/2015 | Hachtmann | B66D 1/39 254/331 |
| 2015/0344136 | A1 * | 12/2015 | Dahlstrom | B64U 50/19 239/722 |
| 2016/0001883 | A1 * | 1/2016 | Sanz | B64U 10/13 244/17.23 |
| 2016/0083115 | A1 * | 3/2016 | Hess | B64F 3/02 701/3 |
| 2016/0096709 | A1 * | 4/2016 | Averill | B66D 1/12 318/6 |
| 2016/0152345 | A1 * | 6/2016 | Molnar | F21V 29/83 244/39 |
| 2016/0264260 | A1 * | 9/2016 | Hachtmann | B64F 3/00 |
| 2016/0318607 | A1 * | 11/2016 | Desai | A01M 7/00 |
| 2016/0338166 | A1 * | 11/2016 | Knaapen | H05B 45/10 |
| 2017/0023947 | A1 * | 1/2017 | McMillion | B64U 80/40 |
| 2017/0137125 | A1 * | 5/2017 | Kales | G09F 21/10 |
| 2017/0217050 | A1 * | 8/2017 | Heath | B29C 35/0288 |
| 2017/0240277 | A1 * | 8/2017 | Molnar | G05D 1/0866 |
| 2018/0001941 | A1 * | 1/2018 | Polidori | B62D 35/007 |
| 2018/0105287 | A1 * | 4/2018 | Carreker | B64G 1/10 |
| 2018/0208310 | A1 * | 7/2018 | Boyk | B64F 1/007 |
| 2018/0259652 | A1 * | 9/2018 | Shimizu | G01S 7/4972 |
| 2019/0049944 | A1 * | 2/2019 | Pohl | B64D 47/02 |
| 2019/0097722 | A1 * | 3/2019 | McLaurin | G02B 19/0057 |
| 2019/0188879 | A1 * | 6/2019 | Shen | G06V 10/751 |
| 2020/0148382 | A1 * | 5/2020 | Tanabe | H04B 7/18506 |
| 2020/0225684 | A1 * | 7/2020 | Anderson | B64U 70/95 |
| 2020/0231279 | A1 * | 7/2020 | Buyse | B64U 10/60 |
| 2020/0310466 | A1 * | 10/2020 | Fischer | B64U 10/60 |
| 2020/0406773 | A1 * | 12/2020 | Lacaze | B60L 53/35 |
| 2021/0061487 | A1 * | 3/2021 | Briggs, IV | B64F 3/02 |
| 2021/0129982 | A1 * | 5/2021 | Collins | B64U 10/60 |
| 2021/0269149 | A1 * | 9/2021 | Culver | B64U 10/60 |
| 2021/0276730 | A1 * | 9/2021 | Jha | B64D 47/06 |
| 2021/0356237 | A1 * | 11/2021 | Priest | H04K 3/45 |
| 2022/0087377 | A1 * | 3/2022 | Garcia | B64U 10/13 |
| 2022/0234757 | A1 * | 7/2022 | Dayan | B64U 70/97 |
| 2022/0236745 | A1 * | 7/2022 | Fagiano | G05D 1/085 |
| 2022/0237910 | A1 * | 7/2022 | Hirai | G05D 1/12 |
| 2022/0413113 | A1 * | 12/2022 | Fluhler | G01S 7/03 |
| 2023/0091643 | A1 * | 3/2023 | Mao | B64U 70/93 414/570 |
| 2023/0312145 | A1 * | 10/2023 | Scott | B64U 70/92 244/137.1 |
| 2023/0331366 | A1 * | 10/2023 | Opitsch | B64U 10/60 |
| 2023/0331409 | A1 * | 10/2023 | Opitsch | B64U 70/93 |
| 2024/0043138 | A1 * | 2/2024 | Schumann | B64U 70/80 |
| 2024/0051661 | A1 * | 2/2024 | Peters | B64C 29/0091 |
| 2024/0076067 | A1 * | 3/2024 | Takahashi | B64U 10/60 |
| 2024/0076070 | A1 * | 3/2024 | Ha | B64U 50/37 |
| 2024/0083576 | A1 * | 3/2024 | Lavigne | B64U 30/20 |
| 2024/0101286 | A1 * | 3/2024 | Regev | G05D 1/0866 |
| 2024/0140629 | A1 * | 5/2024 | Boomgaard | B64U 10/60 |
| 2024/0180062 | A1 * | 6/2024 | Morimoto | G05D 1/6484 |
| 2024/0201418 | A1 * | 6/2024 | Itami | G05D 1/678 |
| 2024/0253819 | A1 * | 8/2024 | Mathew | H01B 7/282 |
| 2024/0262543 | A1 * | 8/2024 | Howe | B64U 70/30 |
| 2024/0266810 | A1 * | 8/2024 | Clarke | B64U 10/13 |
| 2024/0286773 | A1 * | 8/2024 | Humann | B64U 10/60 |
| 2024/0294278 | A1 * | 9/2024 | Ifju | B63B 39/061 |
| 2024/0302481 | A1 * | 9/2024 | de Jong | G05D 1/46 |
| 2024/0317421 | A1 * | 9/2024 | Schumann | B64U 10/13 |
| 2024/0317422 | A1 * | 9/2024 | Schumann | F21V 14/003 |
| 2024/0336377 | A1 * | 10/2024 | Suzuki | B64U 10/60 |
| 2024/0336378 | A1 * | 10/2024 | Neate | B64U 10/60 |
| 2024/0389816 | A1 * | 11/2024 | Li | A47L 1/02 |
| 2024/0400225 | A1 * | 12/2024 | Collins | G05D 1/46 |
| 2024/0400236 | A1 * | 12/2024 | Talke | B64U 70/93 |
| 2025/0164995 | A1 * | 5/2025 | Badalamenti | G05D 1/102 |
| 2025/0187761 | A1 * | 6/2025 | Yamakawa | B64U 70/90 |

OTHER PUBLICATIONS

Prior, Stephen. (2015). Tethered drones for persistent aerial surveillance applications. http://blog.soton.ac.uk/robotics/files/2015/08/Your-article-pages-78-79.pdf.

Steinhäusler, Friedrich. (2020). EU Cursor Drone Fleet: Fast and cost-effective rescue of victims buried under rubble. International Research Journal of Engineering and Technology (IRJET).

Tethered Done systems for emergency outdoor lighting, Dec. 1, 2020, https://www.uavfordrone.com/tethered-done-system-for-emergency-outdoor-lighting/.

Walendziuk W, Falkowski P, Kulikowski K. The Analysis of Power Supply Topologies for Tethered Drone Applications. Proceedings. 2020; 51(1):25. https://doi.org/10.3390/proceedings2020051025.

Schumann, R., Meyer, B., "Drone Base." Design U.S. Appl. No. 29/974,116, filed Nov. 20, 2024.

* cited by examiner

DRONE BASE

BACKGROUND

Drones are often used in fields and technical applications requiring controlled launch and recovery over a wide array of conditions and locations. For example, drones may be utilized in construction, search & rescue, and material handling activities. In operation, recovery of a drone at a specific location with precision can create problem for drone operators particularly during adverse conditions (e.g. high winds, precipitation). In some configurations, automated systems utilize, for example, a combination of image recognition and GPS positioning to guide drones to the specific landing location. The automated systems, while functional, may provide insufficient accuracy and positioning and/or may be cost or weight prohibitive depending upon the performance and requirements of the drone.

SUMMARY

The present disclosure is directed to a system that includes a landing base constructed with raised elements that create landing pockets to accommodate the arms of a drone. As the drone approaches the landing base the arms contact sloping sections of the pockets which guide the drone to the desired landing position. As such, the landing base provides a self-alignment mechanism for the drone that assists with the positioning and alignment of the drone relative to the landing structure. In one example embodiment, a base for engaging a drone includes a collar defined above a landing plane sized to support the drone. The base further includes the self-alignment mechanism having a plurality of drone guides arrayed about a centerline centered on the collar. Each of the plurality of drone guides includes a substantially conical guide including an open base positioned adjacent to the collar and narrowing towards the landing plane, and a landing pad defined as part of the landing plane, wherein the landing pad is adjacent to a narrowed end of the substantially conical guide, and wherein the landing pad is radially aligned relative to the collar.

In other example embodiments, a drone base includes a hemispherical housing formed as part of a landing plane, and a collar defined at an apex of the hemispherical housing, wherein the collar is defined above the landing plane. The example drone base may further include at least two drone guides formed as part of the hemispherical housing, wherein the at least two drone guides are radially positioned about a centerline of the hemispherical housing. Each of the drone guides includes a substantially conical guide including an open base positioned adjacent to the collar and narrowing towards the landing plane, and a landing pad defined as part of the landing plane, wherein the landing pad is adjacent to a narrowed end of the substantially conical guide, and wherein at the landing pad is radially aligned relative to the collar.

The aforementioned features increase the safety of the drone system by protecting both the drone hardware and the personnel working with and near the drone system.

BRIEF DESCRIPTION OF THE DRAWINGS

Example embodiments are described herein with reference to the drawings.

The drawings are schematic and not necessarily to scale. In the drawings, similar symbols typically identify similar components, unless context suggests otherwise.

DETAILED DESCRIPTION

I. Introduction

Figure 1:
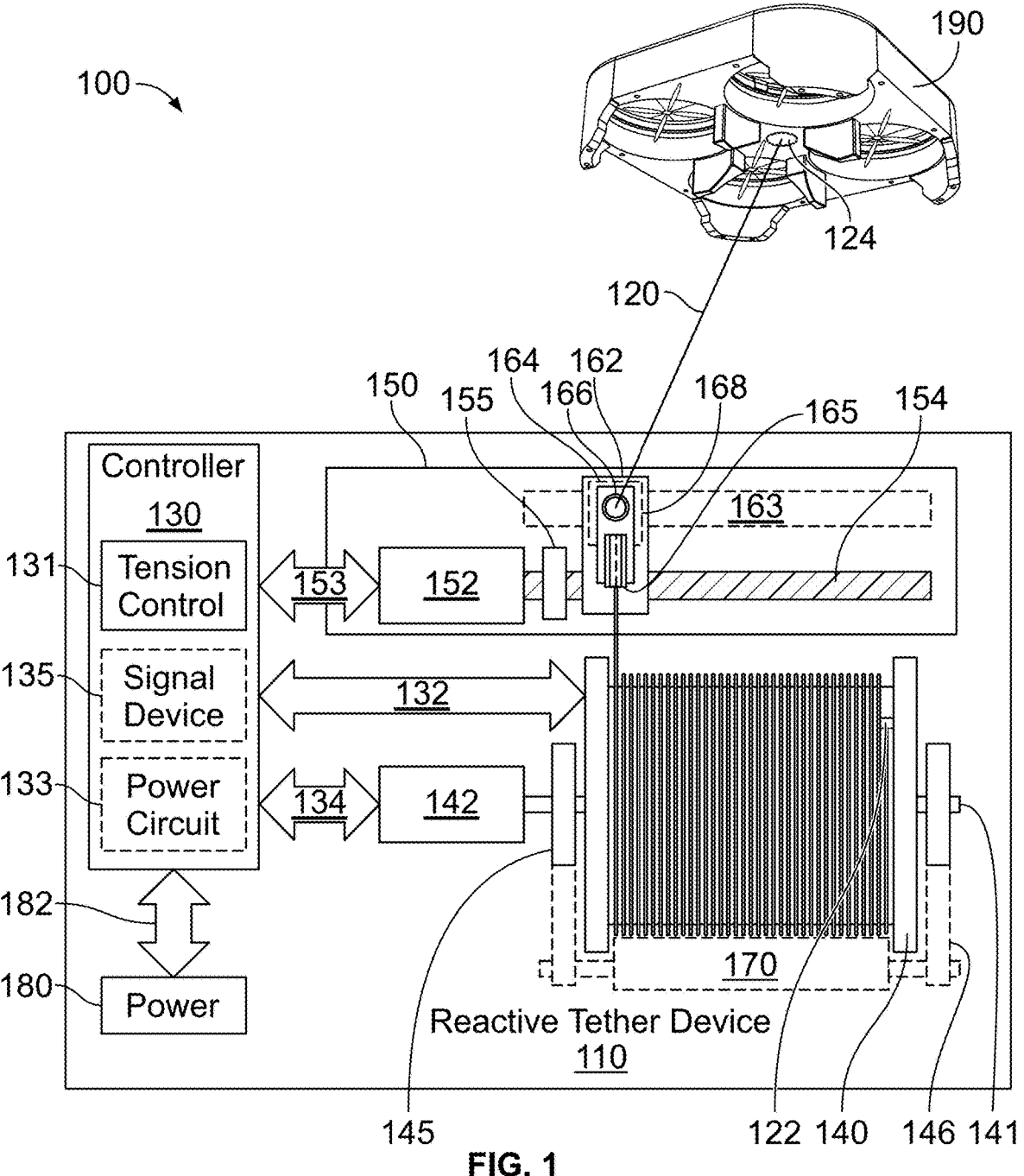
FIG. 1 illustrates a drone system with a reactive tether device.

This patent document describes example embodiments for a drone system that incorporates a drone base. The example drone base incorporates a self-alignment mechanism that serves to mechanically align one or more arms provided as part of an underside of the drone. In an operational example, the drone uses a positioning system such as GPS in conjunction with a camera coupled to an image analysis and recognition system that assists in returning the drone to a landing position above the landing base. The drone, when hovering at the landing position above the landing base, may be drawn towards a drone base by the retraction of a tether. As the tether brings the drone near the drone base, the self-alignment mechanism engages the arms provided on the drone to bring the drone to its final landing position.

An example drone system includes a landing base formed to allow a drone cooperating with the landing base to self-align to a landing position. In an embodiment, the landing base include a drone base formed in the shape of a volcano with a center crater as well as grooves to accommodate the arms of a drone. The volcano shape, along with the receiving grooves, allows the drone to self-align into the grooves and settle into a final and secure landing position. In another embodiment, the drone base is formed in a substantially hemispherical shape.

In some example embodiments, the landing base can be used in conjunction with other positioning systems including GPS, differential GPS, barometric or other altitude measurement systems, image recognition systems in conjunction with one or more cameras on the drone, and other known drone positioning mechanisms. In one embodiment, the GPS and image recognition system may be utilized to return the drone to a landing position designated as a position above the landing base. Once the drone has returned to the landing position and is hovering above the landing base, the tether is retracted drawing the drone towards the landing base. As the tether retracts, when the drone reaches a proscribed distance from the landing base, e.g. 0.2-1 meter (m) above the base, a landing sequence is initiated. The landing sequence brings the drone into contact with the drone base formed as part of the landing base. As part of the landing sequence, the self-alignment features formed as part of the drone base serve to mechanically engage the drone. The mechanical engagement between the drone base and the drone serves to physically align the drone relative to the drone base such that the arms of the drone engage a landing pad when the tether is fully retracted.

In an example embodiment, the drone is a tethered drone configured such that the tether is retracted as the drone approaches the base. The base can incorporate a secondary dump circuit that includes a resistor bank and an LED indicator to discharge residual voltage from the tether and provide a visual indication of safety.

In an example embodiment, the drone system may incorporate a virtual power source mapping circuit adapts the drone to utilize power from the tether while maintaining communication with a battery carried within the drone. The virtual power source mapping circuit may intercept and modify communication messages between the drone and the battery, provide state of charge and state of health information to the drone's control system, enable seamless integration with existing drone battery management systems, support multiple power sources, and maintain communication integrity between the drone and the battery.

II. Example Deployable Drone System

FIG. 1 is an example diagram of a system 100 with a reactive tether device 110 connected to a drone 190 via a tether 120. Herein a "drone" may be referred alternatively to as an "unmanned aerial vehicle" or "UAV". The reactive tether device 110 includes a carriage 145, a drum 140, a drum connector 122, a tether 120, a drum actuator 142, a cable drum feed 150, a drone feed 166, a tension sensor 168, and a controller 130.

Drum 140 may be a spool around which the tether 120 is wound. In operation, rotation of the drum 140, results in the tether 120 being wound or unwound from the drum 140. The rotation of the drum 140 in a first direction causes the tether 120 to be wound, and rotation of the drum 140 in a second direction, opposite of the first direction, causes the tether 120 to be unwound.

The drum 140 may be rotatably mounted to the carriage 145 by an axle 141. The carriage 145 may be constructed by at least two blocks disposed on a base. Alternatively, the carriage be cast, molded, formed and/or the like to contain the drum 140. The carriage may comprise bearings to enable the drum 140 to rotate. In examples embodiments, the carriage 145 may be a clamshell case including a lid to accept and cover the drone 190.

The drum connector 122 is coupled to the drum 140 and electrically connected to a power source 180. The power source 180 may be internal to the drum 140 or external to the drum 140. When the power source 180 is external to the drum 140, the connection to external power source 180 may comprise a signal conduit 132 to a power circuit 133. The power circuit 133 may provide, for example, switching functions, voltage regulation, current regulation, power factor adjustments, and power overload controls. The signal conduit 132 may incorporate a slip ring mechanism, electrical brushes, induction connection to maintain communication of information, power as the drum 140 rotates.

The drum connector 122 may be electrically connected to controller 130 and/or signal device 135. The signal device 135 may be internal to the drum 140 or external to the drum 140. When signal device 135 is external to the drum 140, the connection to signal device 135 may comprise signal conduit 132. The signal device 135 may receive and/or transmit various signals to drone 190 via tether 120. Example of signals comprise, but are not limited to drone control signals, communication signals, video signals, audio signals, transducer signals, and sensor signals. In some example embodiments, signal device 135 may comprise a drone controller. In some example embodiments, signal device 135 may comprise a communications device. In some example embodiments, signal device 135 may comprise both a drone controller and a communications device.

The tether 120 may provide power to the drone 190. Additionally, the signal cable may maintain a communication signal between the drone 190 and the controller 130.

Similarly, the signal cable may maintain a control signal between the drone 190 and the controller 130. A first end of the tether 120 may connect with the drum connector 122 to form a hard wired connection. In some embodiments, the connection to the drum connector 122 may be, for example, via an electromechanical connector.

A second end of the tether 120 may comprise a drone connector 124. The drone connector 124 may be configured to connect with drone or the drone 190. The drone connector 124 may be an electromechanical connector, a mechanical connector, and/or electrical connector adapted to provide the power and/or signals to drone 190. In some example embodiments, the drone connector 124 provides a mechanical connection to tether 120 and the power and/or signals may be provided to drone 190 via a wireless mechanism such as, an induction-based connection, and/or an electromagnetic radiation connection.

The drum actuator 142 may, for example, rotate the drum 140 via a stepper motor, a servo motor, a solenoid, a switch, a clutch, and/or a transmission. The drum actuator 142 may incorporate sensor feedback related to the position of the drum 140. The drum actuator 142 may receive commands from controller 130 via communications conduit 134.

The cable drum feed 150 aligns the tether 120 to the drum 140 during the winding and unwinding process. The cable drum feed 150 may comprise an actuator such as, for example, a linear actuator and/or a tether spooling pulley 165.

The linear actuator includes a lead screw 154, a support 155, a lead screw actuator 152, a movement block 162, and an optional guide bar 163. The lead screw 154 may be rotated by lead screw actuator 152 and controlled by the controller 130. The controller 130 may communicate position information to the lead screw actuator 154 via conduit 153 in order to drive the lead screw 154. Lead screw 154 may be supported by a support structure such as support block 155. The movement block 162 rides along the lead screw such that rotations of the lead screw 154 cause the movement block 162 to translate along the length of the lead screw 154. In some example embodiments, the movement block is supported by an optional guide bar 163. The drone feed 166 may be configured to align the tether 120 as it exits the reactive tether device 110 towards the drone 190.

The tether spooling pulley 165 operates as an alignment pulley to align the tether 120 between the drum 140 and the drone feed 166. Tether spooling pulley 165 is carried along the linear actuator by the spooling block 162 allowing the tether 120 to wind and unwind from drum 140 in a relatively perpendicular orientation. In some embodiments, a tension sensor 168 may measure the force exerted by the tether 120 on pulley 165 attached to movement block 162.

The controller 130 includes at least one processor configured to execute instructions stored as part of a non-transitory computer readable medium. For example, stored instructions may utilize a received tension measurement from the tension sensor 168 and control the position of the first actuator 142 to maintain a determined tension on the tether 120 while performing at least one of the following: unwinding the tether 120, holding the tether 120 in a steady state, winding the tether 120. The controller 130 may include a tension control module 131, a signal device 135, and a power circuit 133.

This patent document incorporates herein by reference the contents of U.S. Pat. No. 10,399,704, entitled, "Reactive Tether Spool" for all purposes.

The controller 130 may further include instructions to generate a virtual power source mapping that adapts the drone 190 to utilize power from the tether 120 while maintaining communication with a battery carried within the drone. The virtual power source mapping may operate to intercept and modify communication messages between the drone 190 and the battery, provide state of charge and state of health information to the drone's control system, enable seamless integration with existing drone battery management systems, support multiple power sources, and maintain communication integrity between the drone and the battery.

In some example embodiments, the controller 130 operating in conjunction with the carriage 145 may include a secondary dump circuit that includes a resistor bank and an LED indicator to discharge residual voltage from the tether 120 and provide a visual indication of safety.

The reactive tether device 110 may incorporate an optional roller 170 configured to apply pressure to tether 120 wound and stored on the drum 140. As the drum 140 is rotated, the optional roller 170 may be configured to apply a degree of pressure to keep the tether 120 adjacent to the drum 140 without hampering the ability of the drum 140 to rotate and/or damaging the tether 120. The optional roller 170 may be rotatably mounted on carriage 146. The carriage 146 may be constructed by at least two blocks disposed on a base. The carriage 146 may be an extension of carriage 145.

This patent document incorporates herein by reference the contents of U.S. Pat. No. 12,043,411, filed on Sep. 13, 2022, and entitled, "Systems and Methods for Tethered Drones," which is claims priority to International Application No. PCT/US2022/076332, filed Sep. 13, 2022, which claims priority to U.S. provisional patent application No. 63/243, 389, filed Sep. 13, 2021, which are further incorporated by reference in their entirety.

III. Example Drone Base

Figure 2:
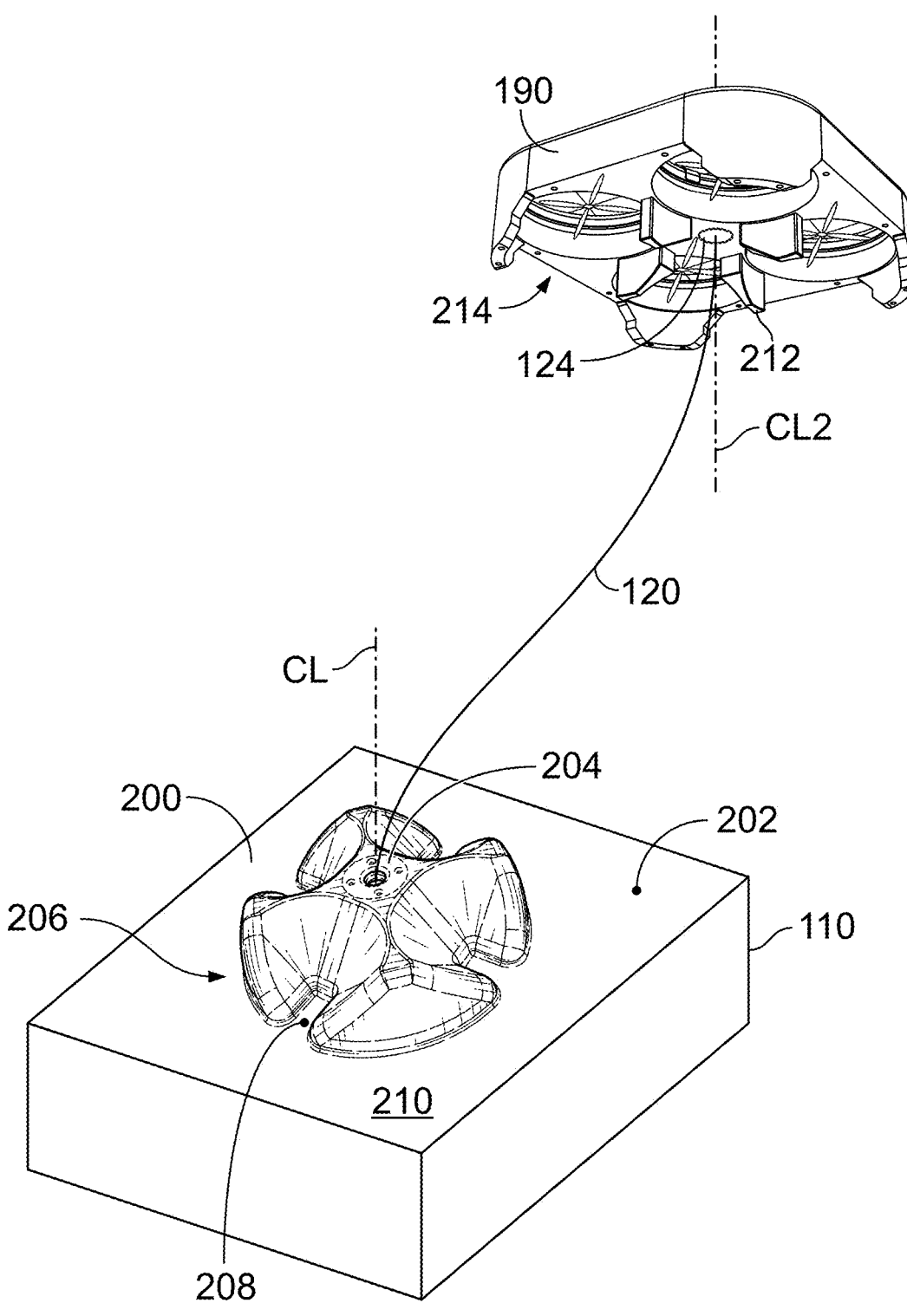
FIG. 2 illustrates a drone base carried by the reactive tether device and coupled to the drone.

FIG. 2 illustrates the drone 190 and reactive tether device 110 coupled by the retractable tether 120. As shown in FIG. 2, the drone 190 is deployed and airborne relative to the drum 140 and a drone base 200 is carried by a top surface 202 of the reactive tether device 110. The drone 190 may be coupled to the carriage 145 by the tether 120 guided through a collar 204 carried as a part of the drone base 200. For example, the drone base 200 may have a substantially hemispherical shape including a circumference defined about a centerline CL. The collar 204 may be aligned with the centerline CL adjacent to an apex of the substantially hemispherical shape. The drone base 200 may include a plurality of drone guides 206 (individually identified as drone guides 206a-206d) configured to self-align the drone 190 during a landing operation. The drone base 200 further includes a landing pad 208 formed in a landing plane 210 to cooperate with each of the plurality of drone guides 206. Each of the landing pads is individually identified as landing pads 208a-208d. The landing plane 210 may be aligned with the top surface 202 or may be offset relative to the top surface. For example, the landing plane may form a pocket of depression relative to the top surface 202.

The physical dimensions of the substantially hemispherical shape comprising the drone base 200 are determined to cooperate with the physical dimensions of the drone 190 such that during a landing operation, the drone 190 self-aligns relative to the drone base 200 about the centerline CL. In an example embodiment, the physical dimensions of the substantially hemispherical shape may be 15-20 centimeters (cm) in diameter allowing for a misalignment or displacement from the centerline CL of approximately 7.5-10 cm (approximately 3-4 inches). In an embodiment, the grooves formed as part of the drone guides 206 accommodate a rotational misalignment on the order of 30°-45°, allowing the drone to gently rotate into position based on its own weight interacting with the plurality of the drone guides 206.

In some example embodiments, the plurality of drone guides 206 arrayed about the centerline CL centered on the collar 204 is configured to complement a plurality of landing struts 212 formed as part of an underside 214 of the drone 190. For example, the plurality of landing struts 212 may be arrayed about the tether 120 coupled to a centerline CL2 of the drone 190. The individual landing struts may be identified as landing strut 212a-212d. As the tether 120 is wound along the drum 140, the drone 190 retracts towards to drone base 200 in a direction dictated by the movement of the tether 120. When the tether 120 is fully retracted, the drone 190 cooperates with the drone base 200 such that the landing struts 212a-212d are positioned within the landing pads 208a-208d.

Figure 3:
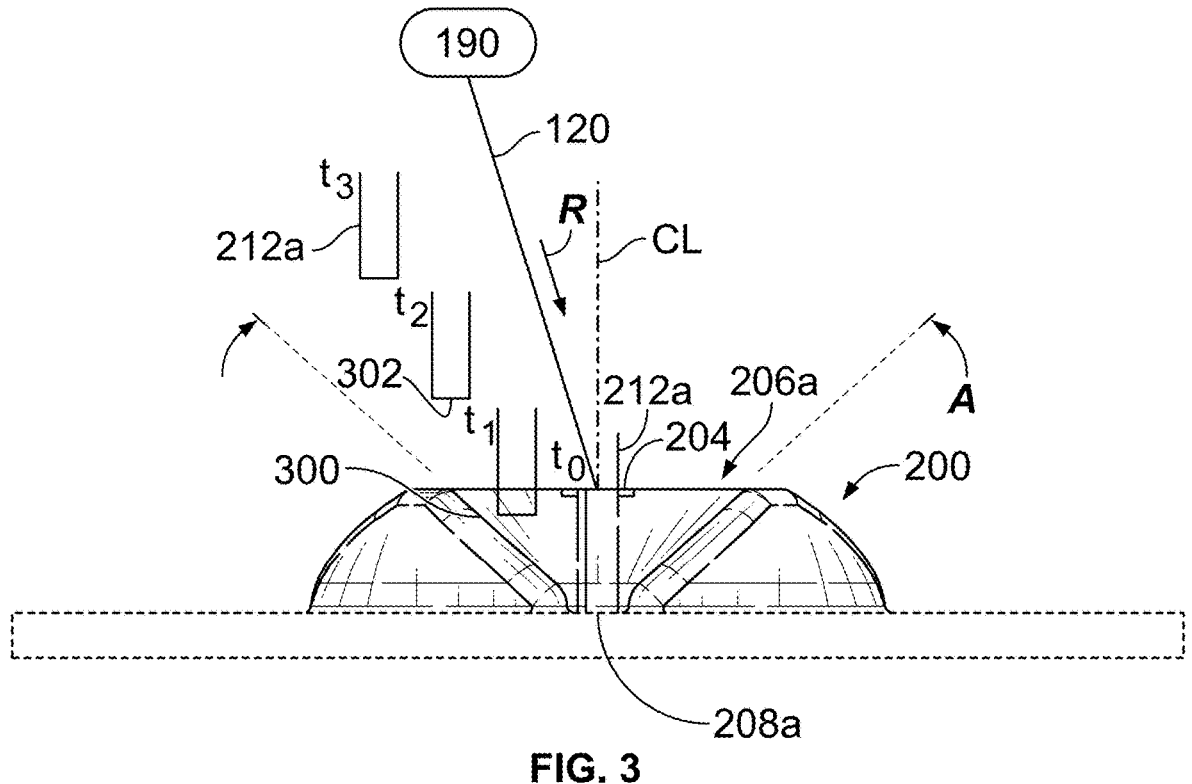
FIG. 3 illustrates a side view of the drone base.

FIG. 3 illustrates a side view of the drone base 200. For example, the drone base 200 is shown as a drone 190 is retracted between time $t_3$-$t_0$ in a direction indicated by the arrow R. In particular, FIG. 3 shows a landing strut 212a provided on the underside 214 of the drone 190 as it is pulled by the tether 120 towards the landing pad 208a cooperating with the drone guide 206a of the drone base 200. As the tether 120, retracts the direction indicated by the arrow R may be altered by the movement of the drone 190, and/or environmental conditions such as wind, rain, or sleet altering the flight characteristics of the drone 190. In other words, the downward force provided by the winding of the tether 120 along the drum 140 includes a lateral force component that may vary laterally relative to the drone base 200 and the landing plane 210.

The drone guide 206a formed as part of the drone base 200 is aligned with the centerline CL and forms an inverted cone or funnel having a first opening and a second opening that is smaller than the first opening. For example, the first opening of the cone may be described by the angle A, and the second opening may correspond to the landing pad 208a. The angle A may correspond to a range from 70°-100° depending upon the operating conditions, design of the landing struts 212 formed on the underside 214 of the drone 190.

Figure 4:
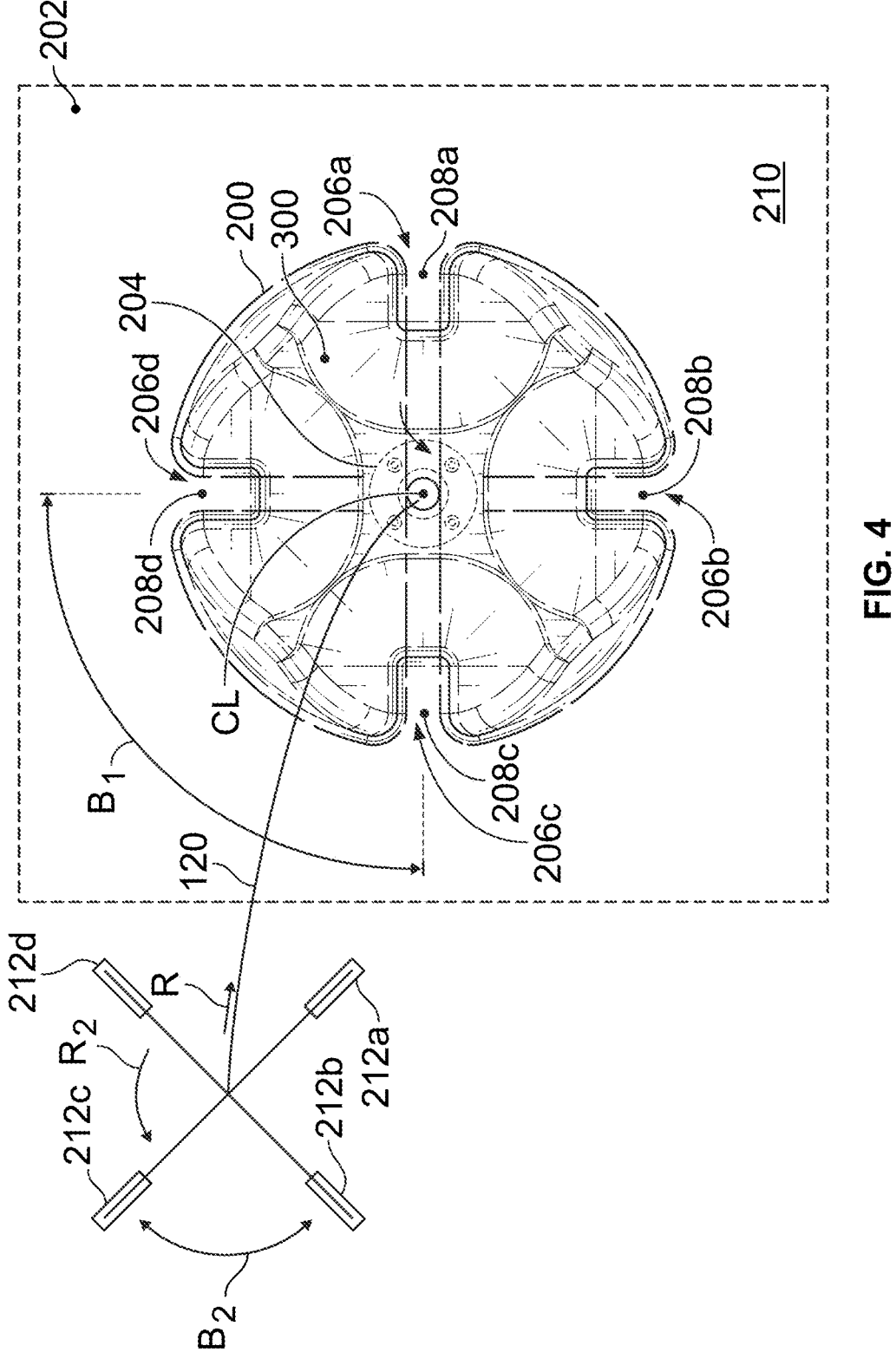
FIG. 4 illustrates a top view of the drone base.

As shown in FIG. 3, the retraction of the tether 120 in the direction R between times $t_3$-$t_2$ causes the landing strut 212a to move towards the drone base 200 while being laterally dragged towards the centerline CL. As the retraction of the tether 120 continues between times $t_2$-$t_1$, the drone is misaligned relative to the drone base 200 as the landing strut 212a comes into mechanical contact with the drone guide 206a. For example, as the tether 120 retracts the sloped wall 300 of the drone guide 206 comes into contact with a bottom surface 302 of the landing strut 212a. The continued retraction of the tether 120 between times $t_1$-$t_0$, the downward force component of the retraction in the direction R causes the landing strut 212a to ride along the wall 300 until it comes to rest on the landing pad 208a. As further shown in FIG. 4, as the landing strut 212a engages the drone guide 206a, each of the landing struts 212b-212d mechanically contacts a corresponding drone guide 206b-206d causing the drone 190 to mechanically align with drone base 200. For example, each of the drone guides 206a-206d is arrayed about the centerline CL and separated by the angle B1. Similarly, each of the landing struts 212a-212d is aligned about a common centerpoint of the drone 190 that accepts the drone connector 124 portion of the tether 120. Each of the landing struts 212*a*-212*d* is arrayed about the centerpoint and separated by the angle B2.

For example, the drone 190 may twist and/or rotate about the tether 120 and the centerline CL as the tether 120 retracts in the direction R. The cooperation between the landing struts 212*a*-212*d* and the individual walls 300 of the drone guide 206*a*-206*d* direct the bottom surface 302 of each landing strut 212*a*-212*d* to a corresponding landing pad 208*a*-208*d*. In this way the incline provided by the inverted cone portion of the landing guides 206*a*-206*d*

Figure 5:
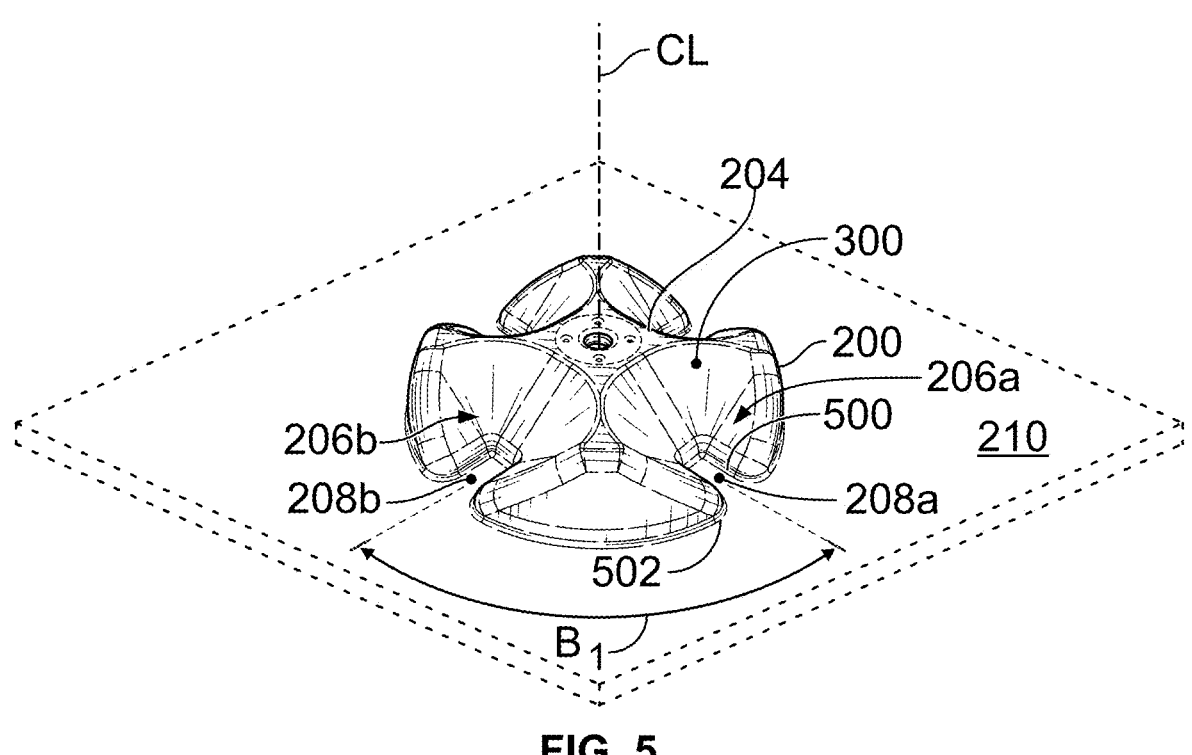
FIG. 5 illustrates the drone base from a first elevation.
Figure 6:
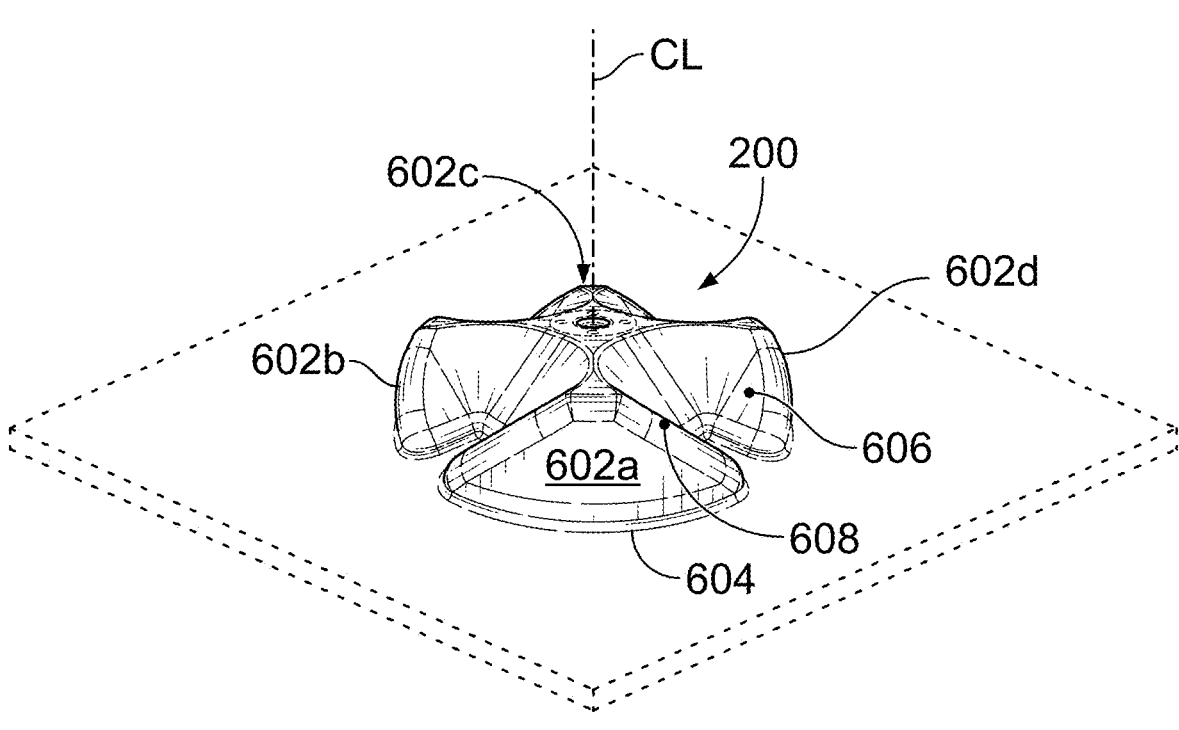
FIG. 6 illustrates the drone base from a second elevation.

FIGS. 5 and 6 illustrate the drone base 200 for a first and second elevation. FIG. 5 illustrates the drone guides 206*a*-206*b* arrayed about the centerline CL separated by angle B1, e.g., a 90° separation. As shown in FIG. 5, the wall 300 forms a curvilinear surface that extends vertically from position adjacent to the collar 204 to the landing plane 210 including the landing pad 208*a*. As shown, the landing pad 206*a* is a rectilinear area including a long axis extending away from the collar 204. The curvilinear surface of the wall 300 extends around the rectilinear area of the landing pad 206*a* from a first long axis side 500 to a second long axis side 502. Accordingly, the curvilinear surface of the wall 300 forms a funnel to guide one of the landing struts 212*a*-212*d* towards a corresponding landing pad 208*a*-208*d*. FIG. 6 further illustrates the hemispherical shape of the drone base 200 including rounded wall segments 602*a*-602*d* that follow the circumference 604 of the drone base 200 and extend towards the centerline CL. In some example embodiments, the curvilinear surface of the wall 300 adjacent to the first long axis side 500 forms a first alignment arm 606. Similarly, the curvilinear surface of the wall 300 adjacent to the second long axis side 502 forms a second alignment arm 608.

In some example embodiments, the drone base 200 may be manufactured from a sheet of thermoplastic material formed over a mold of the drone base 200. The sheet of thermoplastic material additionally form the landing plane 210 and extend away from the circumference 604 of the drone base 200. In some example embodiments, the drone base 200 may stamped, water formed, or otherwise shaped as a part of a sheet metal blank. In other example embodiments, the drone base may be manufactured using a 3D printing or additive process to generate the desired curvilinear surfaces of the drone base 200.

In some example, the drone base 200 and the reactive tether device 110 may cooperate with a secondary guide or funnel extending away from the perimeter of the landing plane 210. For example, when deployed the secondary guide creates an opening larger than the overall body the drone 190. For example, the secondary guided may be a flexible and/or inflatable guide that may be deployed the capture and align the drone 190 relative to the landing plane 210.

IV. Conclusion

It should be understood that the arrangements described herein and/or shown in the drawings are for purposes of example only and are not intended to be limiting. As such, those skilled in the art will appreciate that other arrangements and elements (e.g., machines, interfaces, functions, orders, and/or groupings of functions) can be used instead, and some elements can be omitted altogether.

While various aspects and embodiments are described herein, other aspects and embodiments will be apparent to those skilled in the art. The various aspects and embodiments disclosed herein are for purposes of illustration and are not intended to be limiting, with the true scope being indicated by the claims, along with the full scope of equivalents to which such claims are entitled. It is also to be understood that the terminology used herein for the purpose of describing embodiments only, and is not intended to be limiting.

In this description, the articles "a," "an," and "the" are used to introduce elements and/or functions of the example embodiments. The intent of using those articles is that there is one or more of the introduced elements and/or functions.

In an example embodiment, a base for engaging a drone includes a collar defined above a landing plane sized to support the drone. The base further the self-alignment mechanism having a plurality of drone guides arrayed about a centerline centered on the collar. Each of the plurality of drone guides includes a substantially conical guide including an open base positioned adjacent to the collar and narrowing towards the landing plane, and a landing pad defined as part of the landing plane, wherein the landing pad is adjacent to a narrowed end of the substantially conical guide, and wherein at the landing pad is radially aligned relative to the collar.

In some example embodiments, the collar is configured to accept and guide a tether.

In some example embodiments, the plurality of drone guides are arranged at ninety degree (90°) intervals about the centerline.

In some example embodiments, the plurality of drone guides includes at least two landing pads aligned relative to the collar.

In some example embodiments, the landing pad is a rectilinear landing pad defined in the landing plane.

In some example embodiments, the rectilinear landing pad includes a long axis extending away from the collar.

In some example embodiments, the collar is formed at an apex of a hemispherical housing.

In some example embodiments, the hemispherical housing is formed as part of the landing plane.

In some example embodiments, the hemispherical housing is thermoformed as part of a thermoplastic sheet defining the landing plane.

In some example embodiments, the substantially conical guide includes a pair of alignment arms adjacent to the landing pad.

In some example embodiments, the landing pad includes a first end adjacent to the substantially conical guide and a second end extending between a first alignment arm and a second alignment arm.

In some example embodiments, the substantially conical guide extends from the collar above the landing plane to the landing pad.

In another example embodiments, a drone base includes a hemispherical housing formed as part of a landing plane, and a collar defined at an apex of the hemispherical housing, wherein the collar is defined above the landing plane. The example drone base may further include at least two drone guides formed as part of the hemispherical housing, wherein the at least two drone guides are radially positioned about a centerline of the hemispherical housing. Each of the drone guides includes a substantially conical guide including an open base positioned adjacent to the collar and narrowing towards the landing plane, and a landing pad [rectilinear] defined as part of the landing plane, wherein the landing pad is adjacent to a narrowed end of the substantially conical guide, and wherein at the landing pad is radially aligned relative to the collar.

In some example embodiments, the collar guides a tether.

In some example embodiments, the at least two drone guides are arranged at opposite to each other as part of the hemispherical housing.

In some example embodiments, the landing pad is a rectilinear landing pad defined in the landing plane.

In some example embodiments, the rectilinear landing pad includes a long axis extending away from the collar.

In some example embodiments, the substantially conical guide includes a pair of alignment arms adjacent to the landing pad.

In some example embodiments, the landing pad include a first end adjacent to the substantially conical guide and a second end extending between a first alignment arm and a second alignment arm.

In some example embodiments, the substantially conical guide extends from the collar above the landing plane to the landing pad.

In another example embodiment, a method for landing a drone having a plurality of arms is disclosed. The method includes providing a landing bas where the landing base further includes a horizontal platform in a first plane; a raised portion extending vertically from the horizontal platform to a second plane; and a plurality of receiving slots built into the raised portion. The method further includes landing the drone onto the landing base, wherein during the landing the receiving slots guide the arms of the drone through a vertical descent from the second plane to a position in the proximity of the first plane.

In some example embodiments, the receiving slots have a first width at the second plane and are tapered to a narrower width towards the first plane.

In some example embodiments, the slots result in the drone rotating into alignment with the slots during the movement from the second plane to a position in the proximity of the first plane.

In another example embodiment, am apparatus,

The use of ordinal numbers such as "first," "second," "third" and so on is to distinguish respective elements rather than to denote an order of those elements unless the context of using those terms explicitly indicates otherwise. Further, the description of a "first" element, such as a first plate, does not necessitate the presence of a second or any other element, such as a second plate.

What is claimed is:

1. A base for engaging a drone, the base comprising:
a collar carried above a landing plane sized to support the drone; and
a plurality of drone guides arrayed about a centerline centered on the collar, and wherein each of the plurality of drone guides includes:
   a substantially conical guide including an open base positioned adjacent to the collar and narrowing towards the landing plane; and
   a landing pad defined as part of the landing plane, wherein the landing pad is adjacent to a narrowed end of the substantially conical guide, and wherein at the landing pad is radially aligned relative to the collar.

2. The base of claim 1, wherein the collar is configured to accept and guide a tether.

3. The base of claim 1, wherein the plurality of drone guides are arranged at ninety degree (90°) intervals about the centerline.

4. The base of claim 1, wherein the plurality of drone guides includes at least two landing pads aligned relative to the collar.

5. The base of claim 1, wherein the landing pad comprises a rectilinear landing pad defined in the landing plane.

6. The base of claim 5, wherein the rectilinear landing pad includes a long axis extending away from the collar.

7. The base of claim 1, wherein the collar is formed at an apex of a hemispherical housing.

8. The base of claim 7, wherein the hemispherical housing is formed as part of the landing plane.

9. The base of claim 8, wherein the hemispherical housing is thermoformed as part of a thermoplastic sheet defining the landing plane.

10. The base of claim 1, wherein the substantially conical guide includes a pair of alignment arms adjacent to the landing pad.

11. The base of claim 10, wherein the landing pad include a first end adjacent to the substantially conical guide and a second end extending between a first alignment arm and a second alignment arm.

12. The base of claim 1, wherein the substantially conical guide extends from the collar above the landing plane to the landing pad.

13. A drone base comprising:
a hemispherical housing formed as part of a landing plane;
a collar defined at an apex of the hemispherical housing, wherein the collar is defined above the landing plane; and
at least two drone guides formed as part of the hemispherical housing, wherein the at least two drone guides are radially positioned about a centerline of the hemispherical housing, and wherein each of the at least two drone guides includes:
   a substantially conical guide including an open base positioned adjacent to the collar and narrowing towards the landing plane; and
   a landing pad defined as part of the landing plane, wherein the landing pad is adjacent to a narrowed end of the substantially conical guide, and wherein at the landing pad is radially aligned relative to the collar.

14. The drone base of claim 13, wherein the collar guides a tether.

15. The drone base of claim 13, wherein the at least two drone guides are arranged at opposite to each other as part of the hemispherical housing.

16. The drone base of claim 13, wherein the landing pad comprises a rectilinear landing pad defined in the landing plane.

17. The drone base of claim 16, wherein the rectilinear landing pad includes a long axis extending away from the collar.

18. The drone base of claim 13, wherein the substantially conical guide includes a pair of alignment arms adjacent to the landing pad.

19. The drone base of claim 18, wherein the landing pad include a first end adjacent to the substantially conical guide and a second end extending between a first alignment arm and a second alignment arm.

20. The drone base of claim 13, wherein the substantially conical guide extends from the collar above the landing plane to the landing pad.

* * * * *